United States Patent
Ishizu et al.

(10) Patent No.: US 7,990,923 B2
(45) Date of Patent: Aug. 2, 2011

(54) WIRELESS COMMUNICATION CONNECTION DESTINATION SELECTING METHOD AND DEVICE

(75) Inventors: Eizou Ishizu, Fukuoka (JP); Tamio Shiba, Fukuoka (JP); Manabu Nagano, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 913 days.

(21) Appl. No.: 11/979,158

(22) Filed: Oct. 31, 2007

(65) Prior Publication Data

US 2008/0144581 A1 Jun. 19, 2008

(30) Foreign Application Priority Data

Dec. 19, 2006 (JP) .................................. 2006-341554

(51) Int. Cl.
*H04W 36/00* (2009.01)
(52) U.S. Cl. ....................................................... 370/331
(58) Field of Classification Search ........... 370/331–334
See application file for complete search history.

(56) References Cited

U.S. PATENT DOCUMENTS

| 2002/0082017 | A1 | 6/2002 | Hattori | |
| 2002/0187784 | A1* | 12/2002 | Tigerstedt et al. | 455/439 |
| 2002/0193135 | A1 | 12/2002 | Nakano | |
| 2005/0119001 | A1 | 6/2005 | Watanabe | |
| 2005/0124345 | A1* | 6/2005 | Laroia et al. | 455/437 |
| 2005/0286466 | A1* | 12/2005 | Tagg et al. | 370/329 |
| 2006/0290568 | A1* | 12/2006 | Sillasto | 342/464 |
| 2007/0160007 | A1* | 7/2007 | Wang et al. | 370/331 |
| 2008/0080470 | A1* | 4/2008 | Yano et al. | 370/342 |
| 2009/0103495 | A1* | 4/2009 | Shaheen | 370/331 |

FOREIGN PATENT DOCUMENTS

| CN | 1394396 A | 1/2003 |
| EP | 1 009 183 A1 | 6/2000 |
| JP | 2000-175244 | 6/2000 |
| JP | 2002-199428 | 7/2002 |
| JP | 2005-159929 | 6/2005 |

OTHER PUBLICATIONS

First Notification of Office Action dated Jun. 9, 2010 received in corresponding Chinese Patent Appln. No. 200710170206.9.

\* cited by examiner

*Primary Examiner* — Min Jung
(74) *Attorney, Agent, or Firm* — Murphy & King, P.C.

(57) ABSTRACT

A method for selecting a connection destination for wireless communication from a plurality of base stations in a wireless terminal that is in service areas of the plurality of base stations, which includes a first step (#11) of receiving dispatch information from each of the plurality of base stations, a second step (#12) of obtaining information about each reception power when the dispatch information is received, a third step (#13) of obtaining information about an antenna that is used by each of the base stations for wireless communication after connection from each of the received dispatch information, and a fourth step (#14) of selecting a base station having a highest quality of a communication channel in the wireless communication as the connection destination based on the information about the reception power and the information about the antenna of each of the base stations.

7 Claims, 4 Drawing Sheets

WIRELESS COMMUNICATION CONNECTION DESTINATION SELECTING METHOD AND DEVICE

BACKGROUND OF THE INVENTION

1. Field of the Invention

The present invention relates to a method and a device for selecting a connection destination for wireless communication from a plurality of base stations in a wireless terminal located within a service area of the plurality of base stations. In particular, the present invention relates to a method for selecting a base station so that hand-over can be performed smoothly in a mobile phone.

2. Description of the Prior Art

Recently, mobile communication using mobile phones or PHS phones has been widespread astonishingly. For the mobile communication, wireless terminals (mobile terminals) such as mobile phones, wireless base stations, base station controlling devices, exchanges and the like constitute a wireless communication system (a mobile communication system).

Along with widespread mobile communication, services using various types of wireless communication systems such as PDC, GSM, W-CDMA, CDMA-2000, W-LAN (IEEE802.11), WiMAX (IEEE802.16e) and the like have become available due to advancement of systems and user's taste. These services have different features directing high speed communication, or directing increase of moving speed, or directing increase of service areas or the like.

Under such a situation, hand-over between wireless communication systems, i.e., hand-over between different wireless communication systems is required, so making a specification of hand-over between W-CDMA and WiMAX is being under study in 3GPP (Third Generation Partnership Project).

On the other hand, in the home market of Japan, for example, there is a dual terminal that can support communication between PHS and PDC or between PDC and FDMA (W-CDMA) that is available in the market. However, this terminal is in the situation in which hand-over cannot be performed.

In addition, hand-over in the same system is decided based on reception quality in the terminal (wireless terminal). This is also followed for hand-over between different systems in many cases. For example, EP patent No. 1009183 proposes a structure in which all the different systems transmit common data (common channel) and decide quality of the common channel, and make connection to a system having high quality for performing hand-over.

In addition, U.S. patent application publication No. 2002/0082017 proposes a structure in which decision of reception quality to be an indicator for hand-over is performed in a period depending on a moving speed of a terminal. In other words, the decision period is increased if the moving speed is slow, while it is decreased if the moving speed is fast.

Furthermore, U.S. patent application publication No. 2005/0119001 discloses a structure in which a server that manages wireless communication systems by which a terminal can make communication is provided, and the terminal sends a request to the server when the terminal performs hand-over. In this case, the server informs the terminal of a communication destination having a shortest path, i.e., time for hand-over as a hand-over destination.

However, in recent communication systems, a common channel for dispatch information and individual channels for transmitting user information are provided with different systems having different transmission powers and different structures of antenna. Therefore, in EP patent No. 1009183, even if the common channel has high quality, it may have opposite effect in the case where the relationship is not quality of the individual channels.

The case of U.S. patent application publication No. 2002/0082017 can reduce unnecessary hand-over processes so that power consumption of the terminal can be reduced. However, if a radius of the cell is large and a distance from the base station is small, i.e., even if possibility of hand-over is very low, the decision period becomes short if the moving speed of the terminal is high, so power consumption cannot be reduced.

According to the method of U.S. patent application publication No. 2005/0119001, high speed of hand-over time can be achieved. However, cost of the system increases because installation of the server is necessary.

As described above, there are various advantages and problems in the conventional process for hand-over. In any cases, it is surely advantageous for the wireless terminal located within service areas of a plurality of base stations to select a base station having a highest quality when hand-over is performed or when it is activated, so as to improve stability of communication and to reduce unnecessary processes for hand-over.

SUMMARY OF THE INVENTION

An object of the present invention is to provide a method and a device that enable the wireless terminal located within service areas of a plurality of base stations to select a base station having a highest quality when hand-over is performed or when it is activated.

A method according to one aspect of the present invention is a method for selecting a connection destination for wireless communication from a plurality of base stations in a wireless terminal that is in service areas of the plurality of base stations. The method includes a first step of receiving dispatch information from each of the plurality of base stations, a second step of obtaining information about each reception power when the dispatch information is received, a third step of obtaining information about an antenna that is used by each of the base stations for wireless communication after connection from each of the received dispatch information, and a fourth step of selecting a base station having a highest quality of a communication channel in the wireless communication as the connection destination based on the information about the reception power and the information about the antenna of each of the base stations.

In the present invention, the information about an antenna (antenna information) obtained in the third step is used. More specifically, this information and the information about the reception power obtained in the second step are used for calculating the reception power after connection in the communication channel. Then, the base station having the largest reception power that is calculated is selected as the connection destination.

In this way, the destination of hand-over or the connection destination when it is activated is determined. Therefore, the communication channel having the highest quality is selected when the wireless communication is actually performed. Thus, stability of communication is improved, and the number of processes for connection is reduced.

According to the present invention, in the wireless terminal that is within service areas of a plurality of base stations, it is possible to select a base station having the highest quality upon hand-over or when it is activated.

DESCRIPTION OF THE PREFERRED EMBODIMENTS

The invention will now be described in detail with reference to the attached drawings.

Figure 1:
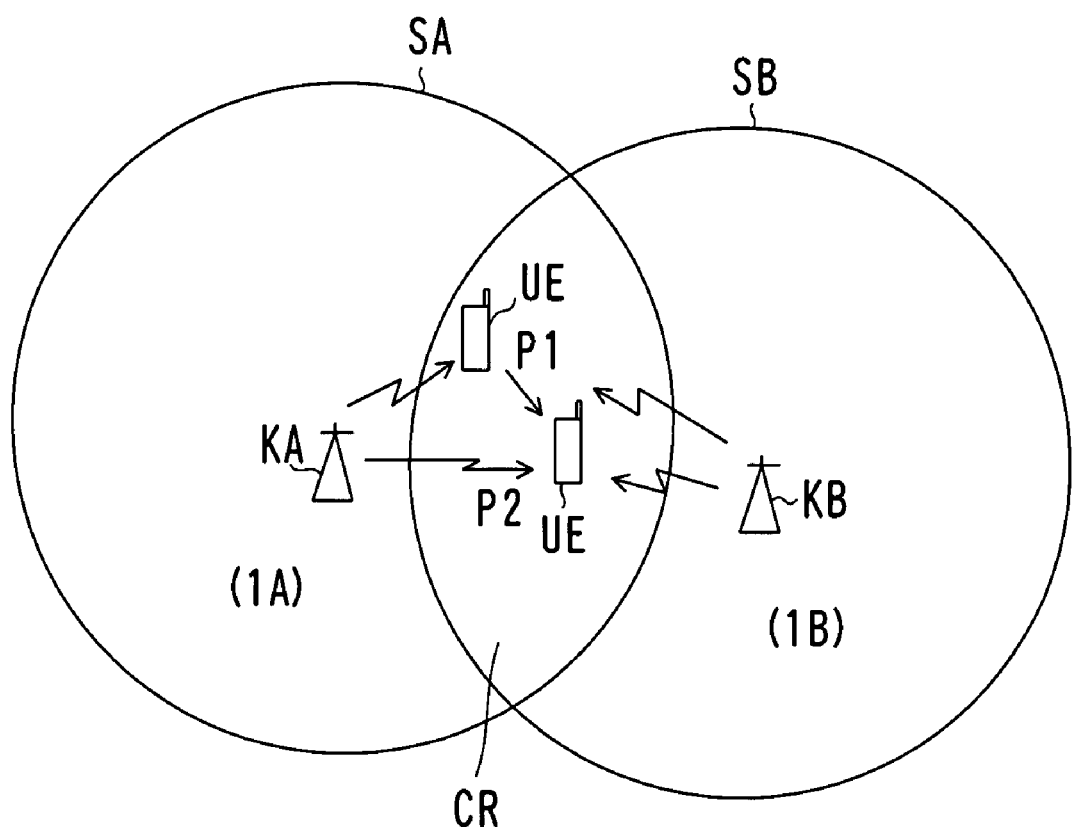
FIG. 1 is a diagram for explaining a selecting method according to an embodiment of the present invention.
Figure 2:
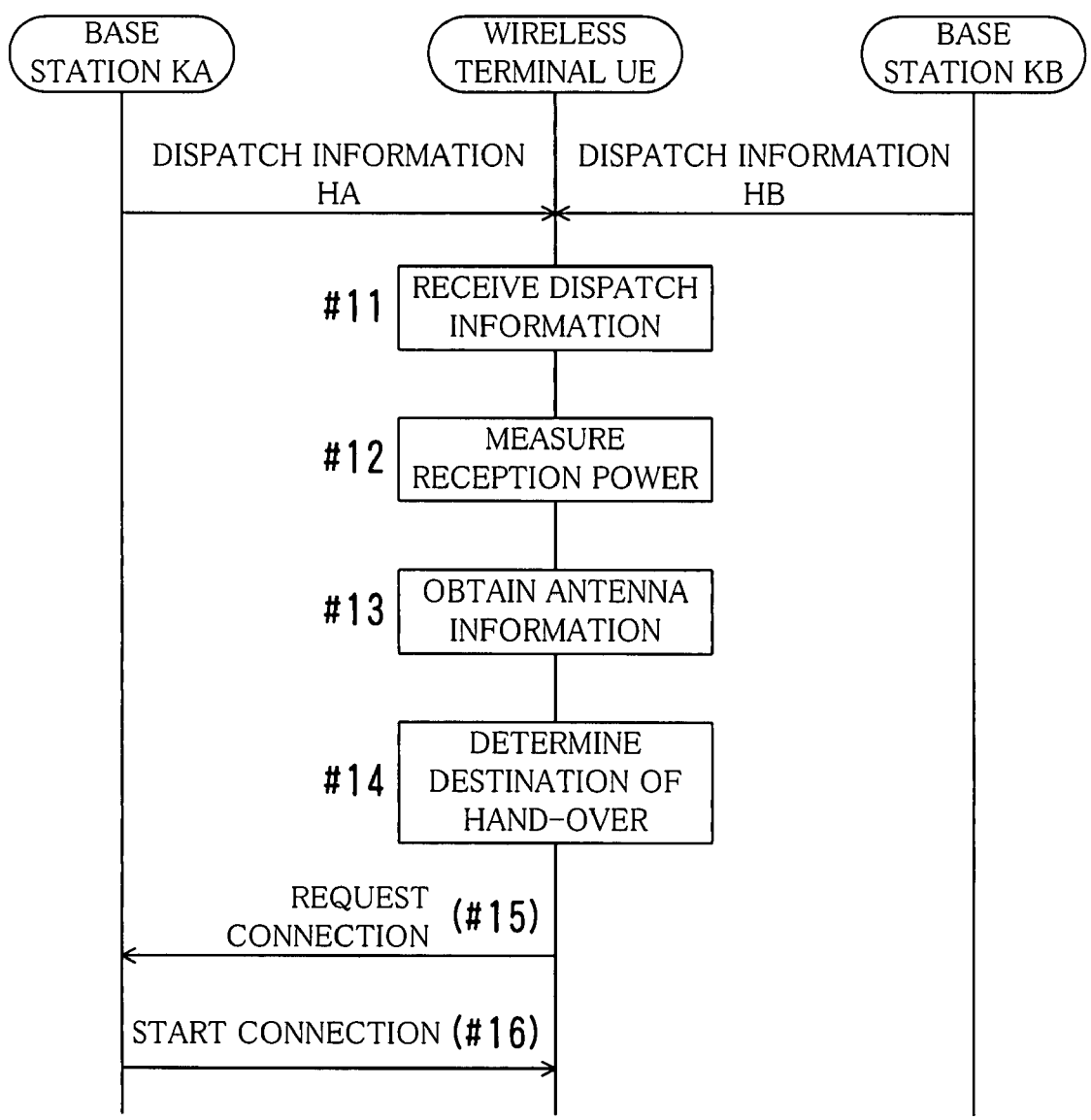
FIG. 2 is a flowchart showing the selecting method according to an embodiment of the present invention.
Figure 3:
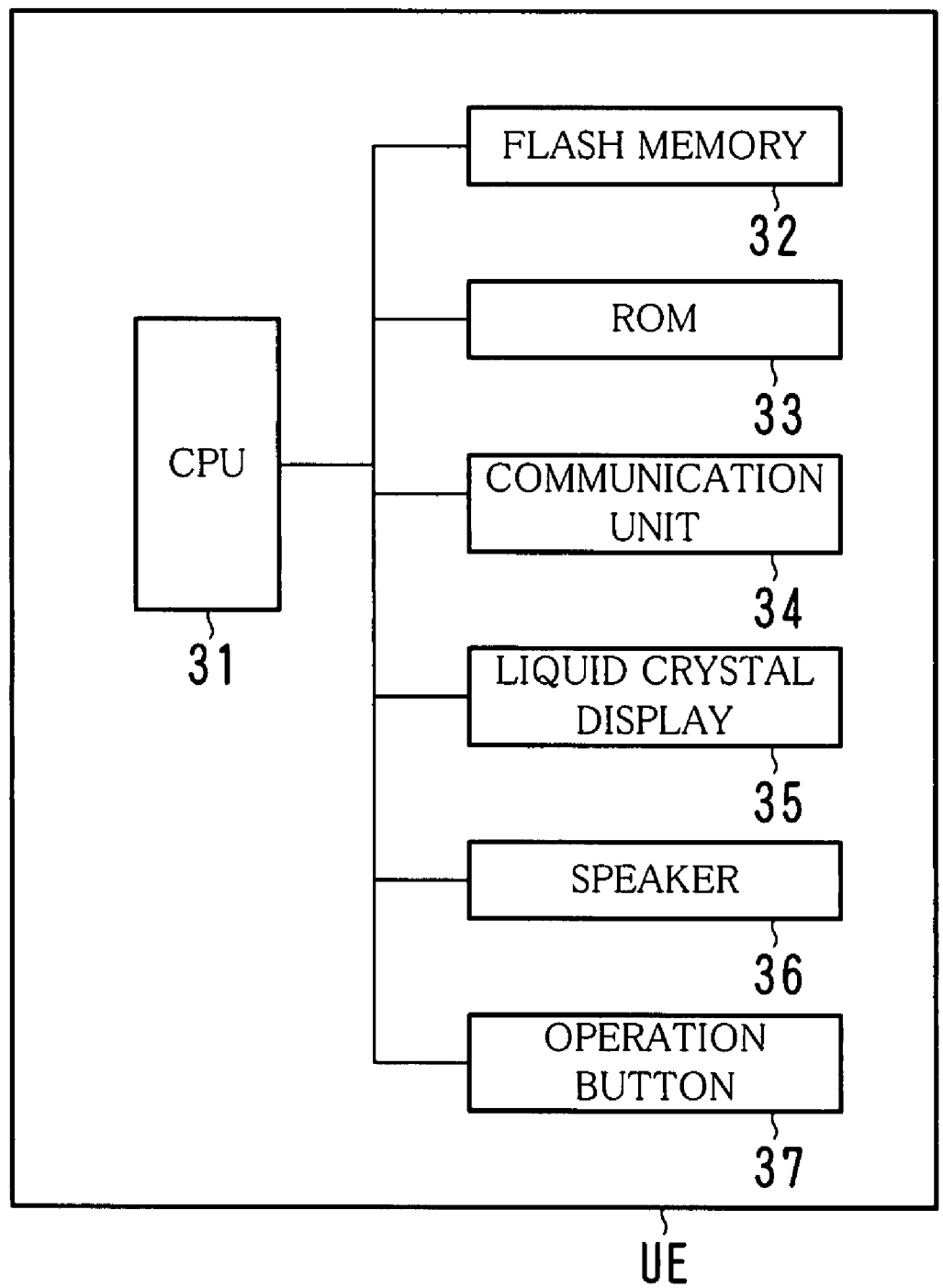
FIG. 3 is a block diagram showing a general structure of a wireless terminal.
Figure 4:
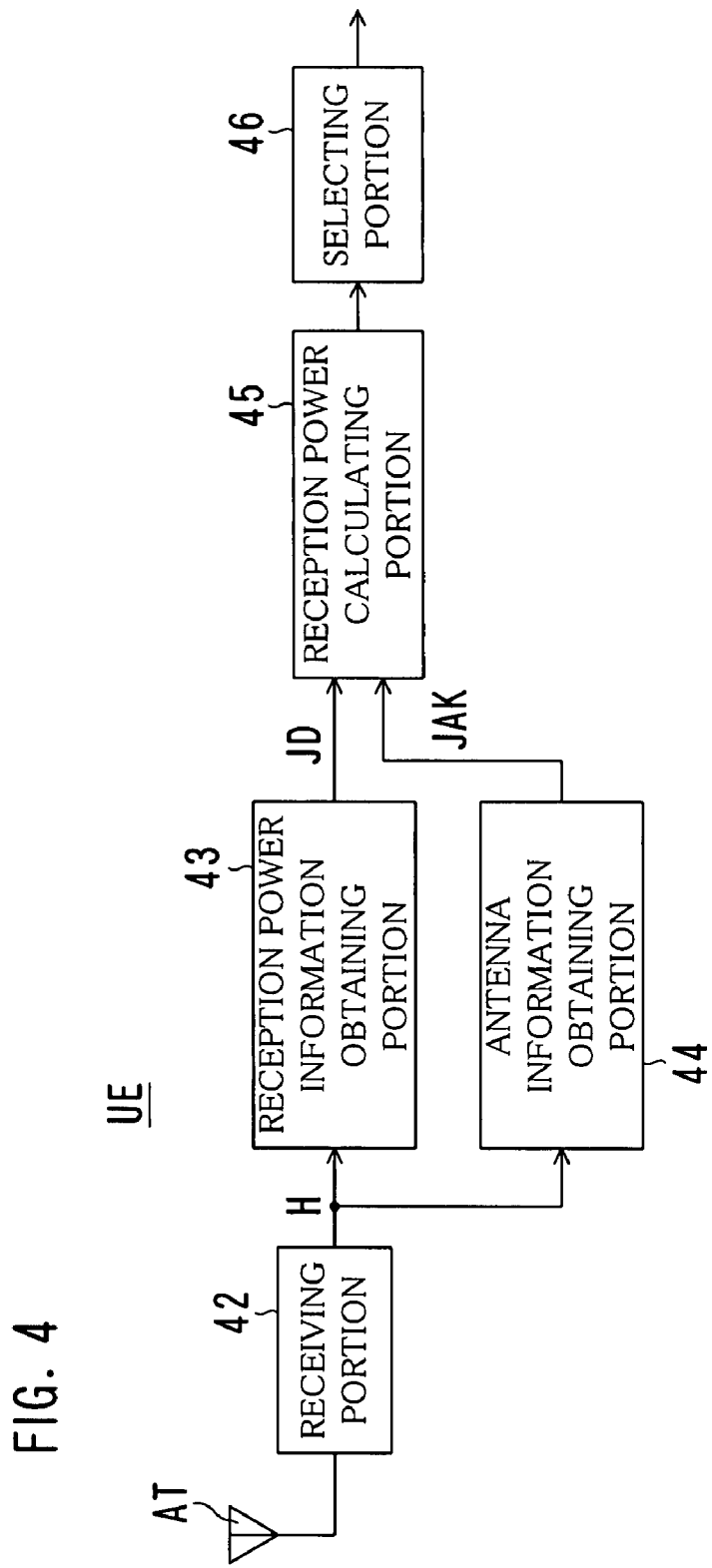
FIG. 4 is a block diagram showing a functional structure of the wireless terminal according to an embodiment of the present invention.

FIG. 1 is a diagram showing service areas of base stations for explaining a selecting method according to an embodiment of the present invention, FIG. 2 is a flowchart showing the selecting method according to an embodiment of the present invention, FIG. 3 is a block diagram showing a general structure of a wireless terminal, and FIG. 4 is a block diagram showing a functional structure of the wireless terminal according to an embodiment of the present invention.

In FIG. 1, two base stations KA and KB and their service areas SA and SB are shown. The base stations KA and KB may belong to the same wireless communication system 1 or to different wireless communication systems 1A and 1B. The service areas SA and SB are areas where a wireless terminal (mobile terminal) UE can receive dispatch information from the base stations KA and KB. They may match areas of cells of the base stations KA and KB or may not match the same. The area that belongs each of the service areas SA and SB is the common area CR.

A user of the wireless terminal UE is located currently at a position P1 and is moving to a position P2. In other words, the wireless terminal UE is located within each of the service areas of the base stations KA and KB and is moving. In this situation, it is supposed that the wireless terminal UE selects a base station to which it should connect next by hand-over.

In FIG. 2, the wireless terminal UE first receives dispatch information HA and HB from a plurality of the base stations KA and KB, respectively (#11). Usually, the dispatch information is broadcasted from a base station K for every wireless terminal T located within a service area S by using a nondirectional antenna (omni antenna).

The dispatch information HA and HB from each of the base stations KA and KB includes information about an antenna that is used for wireless communication after connection is established in each of the base stations KA and KB (antenna information) JAK. In other words, in each of the base stations KA and KB, information about a type and a structure of the antenna that is used for the wireless communication (antenna information) JAK is included in the dispatch information HA and HB.

The antenna information JA specifically indicates "omni antenna", "AAA (Adaptive Array Antenna)", "MIMO (Multi Input Multi Output)", "MISO (Multi Input Single Output)", "SIMO (Single Input Multi Output)" or the like. In addition, it includes the number of antenna elements such as "2", "3", "4" or the like. The antenna information JA is necessary for calculating a gain in the communication. Therefore, the antenna information JA may include information for calculating a gain or information of a gain itself instead of or adding to the type and the structure of the antenna.

The wireless terminal T that received the dispatch information obtains information about each reception power (reception power information) JD just when it received the dispatch information (#12). As the reception power information JD, the reception power may be measured directly or physical quantity corresponding to the reception power may be detected.

Then, it obtains antenna information JAK in each of the received dispatch information HA and HB (#13).

Then, based on the reception power information JD and the antenna information JAK, it selects a base station K having the highest quality of a communication channel in the wireless communication after the hand-over as a connection destination (#14).

When it decides about the quality of the communication channel in the step #14, it calculates a reception power with respect to each of the base stations K after connection. The base station having the largest reception power after connection is regarded as the base station having the highest quality. In this case, a gain is determined based on the antenna information JAK of the base station K and antenna information JAT of the wireless terminal UE. The determined gain is multiplied by the reception power information JD (or added if they are expressed in logarithmic values) to calculate the reception power after connection.

As a result, if it is decided that the base station KA has higher quality of communication channel than the base station KB has, for example, a request for connection is sent from the wireless terminal UE to the base station KA as shown in FIG. 2 (#15). In response to that, the base station KA sends a signal for starting connection to the wireless terminal UE (#16).

It is supposed, for example, that reception power information JDA from the base station KA is −20 dBm and reception power information JDB from the base station KB is −17 dBm. In this case, the base station KB is selected as a destination of hand-over in the conventional method because the reception power information JDB of the base station KB is larger.

However, in the present embodiment, the destination of hand-over is decided by using not only the reception power information JD but also the antenna information JA. Here, it is supposed that the antenna information JAK includes the type "AAA" and the number "4" for the base station KA while it includes the type "omni antenna" for the base station KB.

Then, since the base station KA is AAA of four antennas, the gain is 6 dBm (four times). Since the base station KB is the omni antenna, the gain is 0 dBm (one time).

Therefore, as to the base station KA, the gain of the antenna 6 dBm is added to −20 dBm of the reception power information JDA to make −14 dBm. As to the base station KB, the gain of the antenna 0 dBm is added to −17 dBm of the reception power information JDB to make −17 dBm that is not changed.

As a result, in this case, since the reception power after connection in the base station KA is larger than that of the base station KB, it is decided that the communication channel of the base station KA has higher quality. Therefore, the base station KA is decided to be the destination of hand-over.

Since the destination of hand-over is decided in this way, the communication channel having the highest quality is selected when the wireless communication is performed actually after the hand-over. Thus, stability of the communication is improved, and the number of processes for hand-over is reduced. Therefore, it can be expected that congestion in the wireless communication system is prevented, and it is advantageous for reducing power consumption of the wireless terminal UE.

Furthermore, for example, if the antenna information JAK is "MIMO", and if the number of the base stations K is "2" and the number of the antenna information JAT of the wireless terminal UE is "2", the gain becomes 6 dBm (4 times=2×2). In the same manner, if the number of the base stations K is "2", and if the number of the wireless terminal UE is "1", the gain becomes 3 dBm (2 times=2×1). If the number of the base stations K is "1", and if the number of the wireless terminals UE is "2", the gain becomes 3 dBm (2 times=2×1). If it is possible for the wireless terminal UE to perform diversity reception, it is possible to use the two antennas for the diversity reception as an antenna for MIMO.

Although the example described above shows a case where the wireless terminal UE selects a destination of hand-over, but the present invention is not limited to this, but can be applied to the case of selecting the base station K that performs wireless communication when the wireless terminal UE is powered on and is activated.

In FIG. 3, the wireless terminal UE is made up of a CPU (or a DSP) 31, a flash memory 32, a ROM 33, a communication unit 34, a display 35, a speaker 36, an operation button 37 and the like. It may be equipped with a DSP and a camera.

In FIG. 4, the wireless terminal UE includes a receiving portion 42, a reception power information obtaining portion 43, an antenna information obtaining portion 44, a reception power calculating portion 45 and a selecting portion 46. These individual portions can be realized by a CPU 31 that performs an appropriate program or by a combination of the CPU 31 and a hardware circuit.

The receiving portion 42 receives dispatch information H from radio waves an antenna AT caught. The reception power information obtaining portion 43 calculates the reception power information JD when the dispatch information H is received, and the antenna information obtaining portion 44 obtains the antenna information JAK included in the dispatch information H.

The reception power calculating portion 45 calculates reception power of each of the base stations K after connection based on the reception power information JD, the antenna information JAK and the antenna information JAT. The calculation method is as described above. The selecting portion 46 selects the base station having the highest reception power that was calculated as the connection destination.

Although the case where there are two base stations K to be a target of the selection is explained in the embodiment described above, the present invention can be applied to a case where the destination of hand-over or the connection destination when it is activated is selected from three or more base stations K in the same manner.

Furthermore, the structure, the number of the whole or the individual portions of the wireless terminal UE, the base station K and the wireless communication system, the process contents or the process order, and the like can be modified if necessary in accordance with the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for a wireless terminal to select a base station to communicate with using wireless communications from among a plurality of base stations, the wireless terminal being in service ranges of the plurality of base stations, the method comprising:
   receiving, by the wireless terminal, broadcast information transmitted from each of the plurality of base stations;
   acquiring, by the wireless terminal, for each of the plurality of base stations, information about first received power, the first received power representing a strength of power when the wireless terminal receives the broadcast information;
   acquiring, by the wireless terminal, information about a first antenna included in the broadcast information, the first antenna being an antenna used in each of the plurality of base stations for the wireless communications after connection is established; and
   selecting, by the wireless terminal, one base station from among the plurality of base stations as the base station to communicate with based on the acquired information about the first received power and the acquired information about the first antenna, said one base station having a communication channel of highest quality in the wireless communications.

2. The method according to claim 1,
   wherein, in the fourth step, a value of second received power is calculated, by the wireless terminal, for each of the plurality of base stations, the second received power representing a strength of power for the wireless terminal to receive from each of the plurality of base stations after connection is established, and
   a base station for which the largest value of the second received power is calculated is dealt with by the wireless terminal as said one base station having a communication channel of the highest quality.

3. The method according to claim 2,
   wherein, the value of the second received power is calculated for each of the plurality of base stations, a gain is calculated for each of the plurality of base stations, by the wireless terminal, based on the information about the first antenna of each of the plurality of base stations and information about a second antenna, the second antenna being an antenna of the wireless terminal, and
   the value of the second received power is calculated by multiplying a value of the first received power for each of the plurality of base stations by the gain thus calculated.

4. A method for a wireless terminal located in a common area to select a wireless communication system to communicate with from among a plurality of wireless communication systems, the plurality of wireless communication systems providing services thereof in the common area, the method comprising:
   receiving, by the wireless terminal, broadcast information transmitted from each of a plurality of base stations individually included in the plurality of wireless communication systems;
   acquiring, by the wireless terminal, for each of the plurality of base stations, information about first received power, the first received power representing a strength of power when the wireless terminal receives the broadcast information;
   acquiring, by the wireless terminal, information about a first antenna included in the broadcast information, the first antenna being an antenna used in each of the plurality of base stations for wireless communications after connection is established; and
   selecting, by the wireless terminal, one wireless communication system from among the plurality of wireless communication systems as the wireless communication system to communicate with based on the acquired information about the first received power and the acquired information about the first antenna, said one wireless communication system having a communication channel of highest quality in the wireless communications.

5. A device for selecting a base station to communicate with using wireless communications from among a plurality of base stations, the device provided in a wireless terminal being in service ranges of the plurality of base stations, the device comprising:
  a receiving portion that receives broadcast information transmitted from each of the plurality of base stations;
  a reception power information obtaining portion that acquires, for each of the plurality of base stations, information about first received power, the first received power representing a strength of power when the device receives the broadcast information;
  an antenna information obtaining portion that obtains information about an antenna included in the broadcast information, the antenna being an antenna used in each of the plurality of base stations for the wireless communications after connection is established; and
  a selecting portion that selects one base station from among the plurality of base stations as the base station to communicate with based on the information about the first received power acquired by the reception power information obtaining portion and the information about the antenna acquired by the antenna information obtaining portion, said one base station having a communication channel of the highest quality in the wireless communications.

6. The device according to claim 5, further comprising a reception power calculating portion that calculates a value of second received power for each of the plurality of base stations, the second received power representing a strength of power for the device to receive from each of the plurality of base stations after connection is established,
  wherein the selecting portion selects, as said one base station, a base station for which the largest value of the second received power is calculated.

7. A wireless terminal equipped with the device according to claim 5.

* * * * *